United States Patent [19]

Johnston et al.

[11] 4,390,904

[45] Jun. 28, 1983

[54] AUTOMATIC CIRCUIT AND METHOD FOR EDITING COMMERCIAL MESSAGES FROM TELEVISION SIGNALS

[75] Inventors: Howard R. Johnston, Burnaby; Michael E. R. V. Koombes, Vancouver, both of Canada

[73] Assignee: Shelton Video Editors, Inc., Bellingham, Wash.

[21] Appl. No.: 77,733

[22] Filed: Sep. 20, 1979

[51] Int. Cl.³ .............................................. H04N 5/76
[52] U.S. Cl. .................................. 358/335; 360/33.1; 358/908
[58] Field of Search ..................... 358/127, 4, 10, 139, 358/165, 160, 167, 185, 188, 198, 90, 335; 179/100.1 R, 100.1 PS, 100.1 VC, 1 VC; 360/11, 14, 33, 35, 69, 71, 72.2, 74.4

[56] References Cited

U.S. PATENT DOCUMENTS

| | | | |
|---|---|---|---|
| 2,424,216 | 7/1947 | Atkins | 179/1 VC |
| 2,630,525 | 3/1953 | Tomberlin et al. | 179/100.1 VC |
| 2,761,897 | 9/1956 | Jones | 179/1 VC |
| 3,330,907 | 7/1967 | Arimura et al. | 358/139 |
| 3,378,775 | 4/1968 | Joseph | 358/188 |
| 3,424,865 | 1/1969 | Marchand | 358/165 |
| 3,609,221 | 9/1971 | Langer | 358/188 |
| 3,643,167 | 2/1972 | Mayle | 358/188 |
| 3,843,929 | 10/1974 | Mayle | 325/392 |
| 3,870,956 | 3/1975 | Wolf | 325/478 |
| 3,949,164 | 4/1976 | Murakami et al. | 358/188 |
| 4,000,517 | 12/1976 | Brickerd, Jr. | 179/100.1 VC |
| 4,021,849 | 5/1977 | Wheeler | 358/165 |
| 4,259,689 | 3/1981 | Bonner et al. | |
| 4,314,285 | 2/1982 | Bonner et al. | 360/33 |

FOREIGN PATENT DOCUMENTS 2605161  11/1977  Fed. Rep. of Germany ...... 358/188

OTHER PUBLICATIONS

Electronic Design, Electronics Helps Advertisers Keep Track of their TV Ads, vol. 11, May 27, 1971, pp. 26-27.

Heller, whats new in Commercial Killers, Tech. Rpts., Radio-Electronics, 8/55, pp. 50-51.

Primary Examiner—Raymond F. Cardillo, Jr.
Attorney, Agent, or Firm—Christensen, O'Connor, Johnson & Kindness

[57] ABSTRACT

In order to delete commercial messages during the viewing and/or video tape recording of broadcast television signals a control circuit is disclosed for producing a commercial editing control signal at the beginning of one or more television commercial messages, which signal continues for the duration of such messages and terminates after the end of the last of such messages. The control circuit incorporates detection circuitry for automatically detecting each of a series of fade breaks in the video and audio components of the television signal, wherein such fade breaks normally mark the beginning and end of each of one or more commercial messages that have been inserted in the program content. The first of a series of detected fade breaks marks the beginning of a single commercial or the first commercial in a consecutive block of commercials, and succeeding fade breaks occur at time intervals that correspond to the durations of the commercial messages. Cooperating with the circuitry for detecting the series of fade breaks, is electrical timing circuitry which is triggered to cause the generation of the above-mentioned editing control signal. The timing circuitry has a time out interval that is selected to be just slightly longer than the maximum anticipated length of each of the consecutive commercial messages, and is retriggered each time another fade break is detected. A steady control signal is thus generated which continues until the timing circuitry is allowed to time out because of the absence of detected fade breaks, indicating the resumption of non-commercial program content. In the form of the control circuitry disclosed herein, the automatically generated control signal is used to operate a pause control on a video tape recorder for momentarily stopping the recorder during the occurrence of one or more consecutive commercial messages.

15 Claims, 6 Drawing Figures

AUTOMATIC CIRCUIT AND METHOD FOR EDITING COMMERCIAL MESSAGES FROM TELEVISION SIGNALS

BACKGROUND OF THE INVENTION

The present invention pertains to the field of video equipment and systems, and more particularly is concerned with control circuitry for automatically detecting and editing commercial messages from standard television broadcast signals.

The removal or editing of commercial messages from the reception and/or video recording of television signals has long been a goal of innovators in the video equipment industry. Thus far, little progress has been made in providing a reliable circuit or method of automatically detecting the occurrence and duration of commercial interruptions in the program content of a television signal. Such capability is particularly desirable when combined with video tape recorders used for unattended recording of off-the-air television broadcasts. The resulting recording would store the program content, skipping over those portions of the broadcast television signal that carry the commercial interruptions.

Thus far, efforts to develop such a system have been only partially successful. For example, one currently available device is effective to blank out or delete color commercials that have been interposed in black and white telecasts. The black and white television signal, is fundamentally different in content from a color broadcast signal. The available editing device is capable of detecting this difference and in response thereto produces a control signal that begins at the start of the color commercial and ends when the black and white program content resumes. The generated control signal can be used to interrupt the operation of video tape recorders that are equipped with a pause control. During the color commercial, the video recorder is momentarily stopped (placed in a pause mode) and then is automatically restarted upon termination of the control signal and hence at the resumption of the black and white program content.

Such a device has apparent limitations in that it can only be used for telecasts of black and white movies, or for early serials that were originally taped in black and white. Such devices are totally ineffective for extracting color commercials from color program content which constitutes the great majority of telecasts today.

Accordingly it is an object of the present invention to provide a commercial deleting control circuit and method that are effective to edit commercial messages from television broadcast signals in which both the commercials and the program content interrupted thereby are in color.

A more particular object of the present invention is to provide a control circuit for use with a video tape recorder for automatically interrupting the operation of the video recorder during a taping of a color television signal, so as to omit the recording of one or a succession of brief commercial messages.

SUMMARY OF THE INVENTION

These and other objects, features and advantages of the invention are achieved by a commercial editing control circuit for producing an editing control signal which has a predetermined timing relationship to the occurrence of a series of detectable breaks in the telecast that characteristically occur prior to and at the end of each commercial message. More particularly, the control circuit comprises detection circuitry for automatically detecting the occurrence of each such break in the telecast, and for responsively producing a timer triggering signal coinciding with each thusly detected break. Timing circuitry cooperates with the detection circuitry and starts timing in response to the receipt of an initial trigger signal caused by the occurrence of a first of a series of breaks and is retriggered to restart the timing interval each time another trigger signal is received from the break detection circuitry. The timing interval of the timing circuitry is selected to be equal to or preferably just greater than the maximum expected duration of a commercial message such that in response to a series of consecutive commercial messages, each being of the maximum expected duration, the detection circuitry produces a series of timer signals which repetitively restart the timing circuitry before or when it times out. The last of the series of trigger signals, which occurs in response to the last break in the telecast prior to resumption of program content, restarts the timing interval of the timing circuitry and since no further triggering signals will be received, the timing circuitry times out.

Responsive to the timing circuitry is a signal generator for producing the editing control signal which is effective to edit out the commercial message or messages so long as the timing circuitry remains in a timing mode, and has not timed out. It is observed that the editing control signal persists for a short duration beyond the end of the last commercial message and thus encompasses a brief segment of the succeeding program content of the television signal. However, the persistence of the editing control signal beyond the end of the commercial messages has been found from empirical testing, to be an entirely acceptable operating characteristic of the invention.

In one embodiment of the invention as disclosed more fully herein, the control circuit is combined with a videotape recorder (VTR) and the editing control signal is effective to cause the VTR to assume a pause mode during the commercials. Thus, the editing control signal temporarily stops the recorder at the start of the first commercial message, and maintains the recorder in the pause mode until after a brief interval following the end of the last of a series of commercial messages. During playback of the thusly edited video recording, the commercial messages are totally removed, as is a brief, and for the most part, an unnoticeable, initial segment of the ensuing program content.

In accordance with a preferred form of the invention, the breaks in the telecast that occur at the beginning and end of each commercial message are detected by sensing the absence of a predetermined minimum amplitude of the video component of the television signal that is associated with a momentary fade of the video picture. If the video amplitude falls below the preset minimum level for a predetermined duration, such as two consecutive video fields, then a valid break in the telecast is detected. Furthermore, in accordance with the preferred form of the invention, the audio component of the television signal is monitored along with the video component, and a valid break will be detected only in the event that both the video and audio signal components are detected falling below predetermined minimum energy or amplitude levels. In other words, a coincidence of absence of video and absence of audio is required before a valid break signal will be produced for triggering or retriggering the associated timing circuitry.

In still a further preferred embodiment of the invention, circuitry is provided for enabling the control circuit to operate in a selected one of two different timing modes. A first of these timing modes provides an operation as characterized above. A second selectable timing mode provides for the insertion of an extended fixed interval, for example of one-and-a-half to two minutes duration, which is initiated upon the detection of the first valid break in the telecast. During the initial fixed time interval, the editing control signal is continuously generated and does not depend upon the occurrence of succeeding breaks in the telecast. At the end of the extended fixed interval, the control circuitry automatically resumes the foregoing retriggerable timing mode in which the time-out interval is set at a duration just slightly longer than the maximum expected length of a single commercial message. Following the end of the fixed interval, if additional commercial messages are being presented and the associated breaks are reoccurring, the timing circuitry will be retriggered and will continue to remain in a timing mode. The editing control signal will persist, and only after the last of the detected breaks in the telecast will the timing circuitry time out and terminate the control signal.

To provide a complete disclosure of the invention, reference is made to the appended drawings and following description of certain particular and currently preferred embodiments.

DETAILED DESCRIPTION OF THE DRAWINGS

Figure 1:
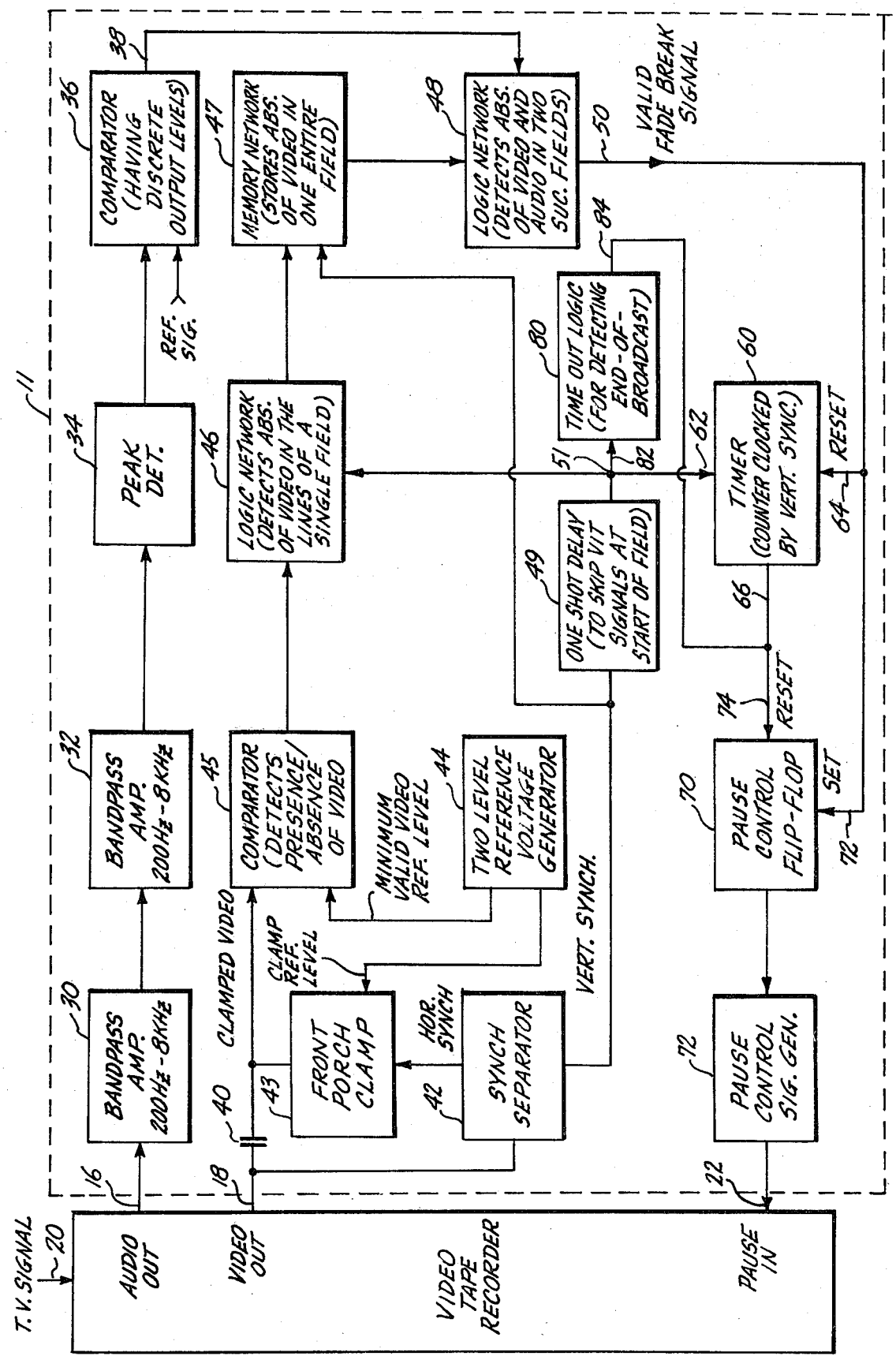
FIG. 1 is a complete block diagram of a currently preferred embodiment of the commercial editing control circuit of the invention, shown in combination with a videotape recorder.

FIG. 1 is a block diagram of a commercial editing control circuit 11 constructed in accordance with the currently preferred embodiment of the invention, and shown in combination with a conventional videotape recorder (VTR) 12 for automatically deleting commercial messages during the recording of a television signal. Although circuit 11 has general utility for deleting or blanking commercial messages from a received telecast, such as by momentarily turning off the picture and/or sound of a television receiver during the commercial interruption, it is employed most advantageously in combination with a VTR for selectively interrupting the VTR recording function during the commercial or commercials. Then, during playback, the VTR reproduces the television signal program without interruption and with the commercial messages deleted.

In this environment, circuit 11 cooperates with a VTR 12 of the type that separates the audio and video components of a television signal applied at an input 20, and has or can be adapted to provide an audio channel output 16 and a video channel output 18. Additionally, VTR 12 has or can be modified to have a pause control input 22 of the type that is triggered by an electrical signal. In response to receipt of such a pause control signal at input 22, the recording function of VTR 12 is temporarily stopped until restarted by a signal change at input 22. To simplify the present disclosure, the playback controls and functions of VTR 12 have been omitted from the drawings and description and it will be assumed that VTR 12 is operating in the record mode.

Circuit 11 incorporates circuitry for detecting each break in the telecast wherein the presently disclosed embodiment senses these breaks by detecting a simultaneous fade in the video and audio signal components. Another principal section of circuit 11 includes timing circuitry that cofunctions with the fade detection circuitry and develops a timing signal having a predetermined relationship to a series of detected telecast breaks that are closely spaced in time. Also, circuit 11 has pause control circuitry for generating a pause control signal for application to the pause input 22 of VTR 12 in response to the operation of the timing circuitry.

Thus, in FIG. 1, circuit 11 includes an audio fade detection channel connected to the VTR's audio output 16 and provided by the serial connection of a first band pass amplifier 30, a second band pass amplifier 32, a peak detector 34, and a comparator 36 having an output 38. The cascaded band pass amplifiers 30 and 32 have pass bands selected to eliminate any stray synch signal energy present in the audio channel. The thusly filtered audio signal is applied to the peak detector 34 which detects peak levels of audio energy within the channel and an output of detector 34 is applied as one input to comparator 36. The signal energy in the audio channel thus received at comparator 36 is compared with a reference signal, collected so that an output 38 of comparator 36 switches between two discrete output signal levels in response to the presence or absence of significant audio energy, i.e., audio signals having strength above a preset minimum, in the audio signal channel. Thus, output 38 is normally at a low level during the presence of audio in the television signal and switches to a high level during the absence (fade) of audio.

The video fade detection channel of circuit 11 is connected to video output 18 of VTR 12 and includes: a blocking capacitor 40 and a synch separator 42 jointly connected to output 18; a front porch clamp 43; a two level reference voltage generator 44; a voltage comparator 45 for detecting the presence/absence of video above at predetermined minimum level; a logic network 46 for detecting such absence of video in each of the lines of a single field; a memory network 47 for storing the absence of video for an entire field; and a logic network 48 for detecting the absence of video and audio in two successive fields.

Additionally, a one-shot delay 49 is provided for delaying the vertical synch signal from synch separator 42, prior to application of vertical synch to network 46 in order to skip over the vertical interval test signals (VIT) that occur at the start of each field. Without delay 49, the VIT signals would cause network 46 to sense the presence of video at the beginning of a field even though the remaining lines of the field are blank during a valid video fade.

As described in greater detail below in connection with FIGS. 2 and 3, the foregoing video fade detection circuitry functions to monitor the video signal energy produced in the signal at output 18 of VTR 12 and if there is an absence of video above a predetermined signal level in the individual raster lines of the video signal for a span of two successive fields (corresponding to momentary blackness on the screen of a television receiver) then network 48 detects this condition. If, during the same two successive video fields, there is an absence of audio as represented by a high level signal at output 38 from the audio detection channel, then network 48 produces at an output 50 a valid fade break signal at the end of the second of the two fields.

The timing section of control circuit 11 is provided by a timer 60, which in the illustrated and currently preferred embodiment is provided by a counter clocked by vertical synch pulses received at a clocking input 62. The counter of timer 60 is constructed so as to divide the frequency of the vertical synch pulses down to a predetermined timing interval. This timing interval is selected, for reasons more fully described below, to be just a few seconds longer than the maximum expected duration of a single commercial message. Thus, following a reset signal applied at a reset input 64, the counter of timer 60 is clocked by the vertical synch pulses and at the end of the predetermined timing intervals timer 60 via its internal counter produces a time-out signal at an output 66. If, at any time prior to time-out, timer 60 is reset by a valid fade break signal generated at output 50 and applied to reset input 64 of timer 60, the timing interval is restarted. If reset input 64 does not receive such a valid fade break signal, then the counter of timer 60 will run a full interval and produce a time-out signal at output 66.

The pause control circuitry of circuit 11 includes a bistable pause control flip-flop 70 and a pause control signal generator 72. The flip-flop 70 has a set input 72 connected jointly with the reset input 64 of timer 60 to receive the valid fade break signal 50. A reset input 74 is connected to the time-out output 66 of timer 60 such that the flip-flop 70 is initially switched to its "set" state by a valid fade break signal from network 48 applied to set input 72, and is thereafter switched back to its reset state by a time-out signal applied to reset input 74 by timer 60. An output of flip-flop 70 is connected to a pause control signal generator 72 which converts the electrical state of flip-flop 70 into a suitable signal for application to pause input 22 of VTR 12.

Additionally, control circuit 11 preferably includes a time-out logic network 80 having an input 82 connected to receive the delayed vertical synch pulses and an output 84 connected to apply a reset signal to reset input 74 of a pause control flip-flop 70. As more fully described hereinafter, logic network 80 detects the loss of vertical synch at input 82, such as will occur at the end of the broadcast day, and responsively produces a reset signal at its output 84 for disposing the pause control flip-flop 70 in its reset and non-pause state, causing VTR 12 to continue operating and recording. Logic network 80 thus insures that VTR 12 will not be held in a pause condition indefinitely at the end of the broadcast day, which if allowed to occur, would result in excessive damage to the video tape. Rather, VTR 12 is caused to continue recording until eventually turned off by an auxilliary clock (not shown) or by an automatic shut-off feature (not shown) activated upon reaching the end of the videotape.

Figure 2:
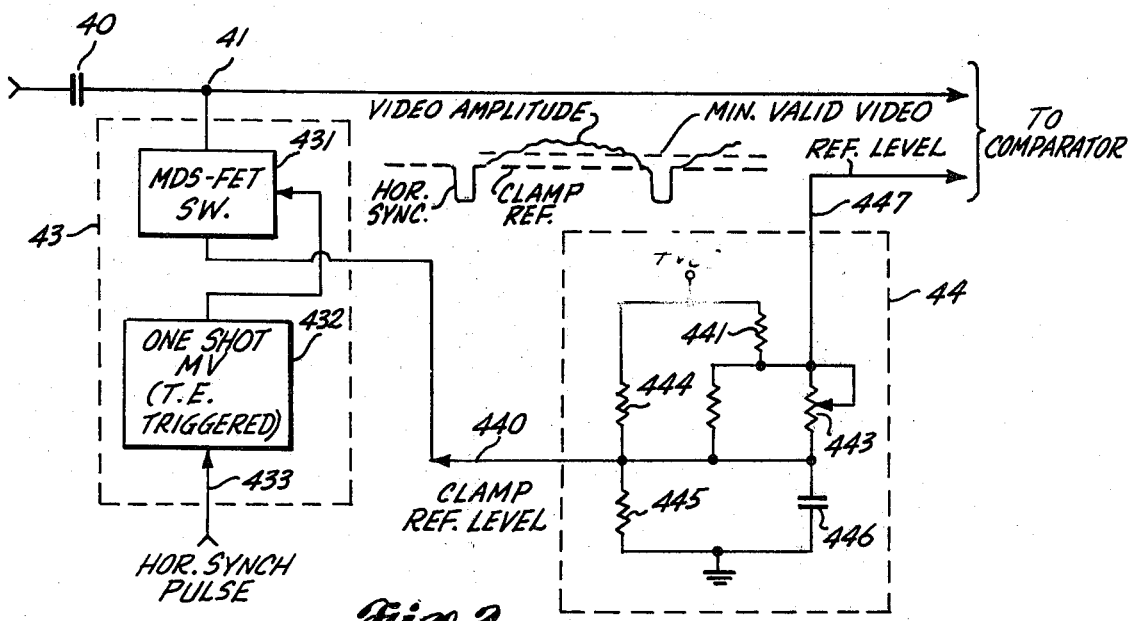
FIG. 2 is a detailed block and schematic diagram of a portion of the circuit shown more generally in FIG. 1.

With reference to FIG. 2, front porch clamp 43 may be provided as illustrated by a MOS-FET switch 431 and a one-shot multivibrator 432 that is triggered by the trailing edge of an input pulse, here in the form of horizontal synch, applied at a trigger input 433. Multivibrator 432 in response to triggering by the trailing edge of horizontal synch, opens switch 431 and thereby clamps the DC level of the video signal at the downstream side of blocking capacitor 40 to a predetermined clamp reference level. The clamp reference level is produced by a the two level reference voltage generator 44 and is applied over a lead 440, via switch 431, to a connection 41 in a lead carrying the video signal to one input of comparator 45.

Two-level reference generator 44 produces two related voltage reference signals and includes a resistive voltage divider network formed by resistors 441, 442, 443, 444, and 445. Capacitor 446 filters spurious signals and steadies the level of the reference signal outputs, one of which is produced on lead 440 as mentioned above, and the other of which is produced on an output lead 447. The resistive voltage divider network is connected between the supply voltage $+V_{cc}$ and ground, such that the voltage level on lead 440 is at a selected reference level between ground and $+V_{cc}$, while the voltage level on output lead 447 is slightly higher than on lead 440. In particular, lead 447 provides a minimum valid video reference level which is adjustable by means of variable resistor 443 to be at a desired level above the clamp reference level provided on lead 440.

Thus, as illustrated by the wave form shown in conjunction with the circuit components of FIG. 2, each horizontal synch pulse causes the video level at connection 41 to be clamped to the clamp reference level provided on lead 440 by generator 44. By so clamping the video signal at connection 41, a stable reference level is established with respect to which the ensuing amplitude of the video line can be compared in comparator 45 to a predetermined minimum valid video reference level provided on lead 447. If video of sufficient amplitude is present in the line that follows in a particular horizontal synch pulse, then the video amplitude will exceed the minimum valid video reference level fixed by the voltage on lead 447. Responsively, comparator 45 (FIG. 1) will produce a signal at its output representing the presence of video in that line. If the amplitude of the video falls below the minimum valid reference level, then the output of comparator 45 will assume a different voltage condition, indicating the absence of video above the minimum reference level in that particular line.

Figure 3:
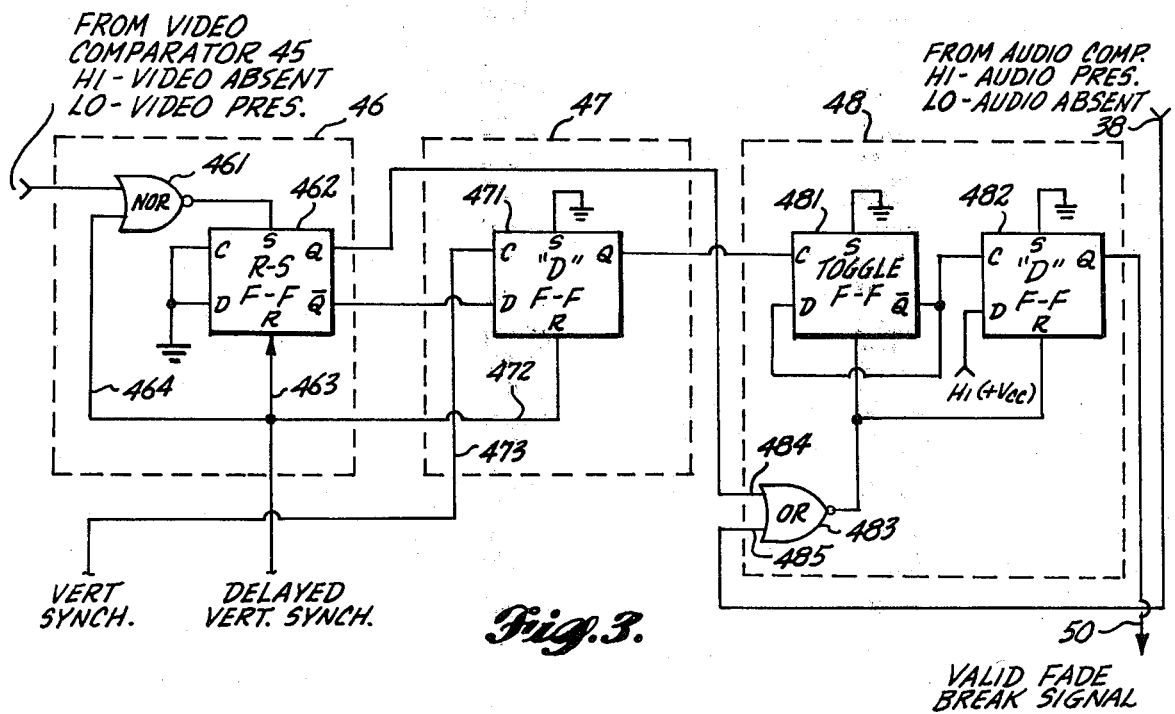
FIG. 3 is another combined schematic and block diagram of another portion of the circuit of FIG. 1.

With reference to FIG. 3, in this particular embodiment, the output of comparator 45 swings between two discrete output levels and is low when the minimum valid video reference level has been exceeded, indicating the presence of video, and is high when the absence of video has been detected. This high or low logic signal is applied to one input of a NOR gate 461 of logic network 46, which also includes an R-S flip-flop 462. The output of the NOR gate 461 is applied to the set (S) input of flip-flop 462, and the delayed vertical synch pulses from the output of delay 49 are connected via lead 463 to the reset (R) input of flip-flop 462. The delayed vertical synch is also connected to a second input of NOR gate 461 via lead 464, and the C and D inputs of flip-flop 462 are grounded.

Memory network 47 includes a D-type of flip-flop 471 which has its set (S) input grounded, its reset (R) input connected to delayed vertical over lead 472, its C input connected to the undelayed vertical synch over lead 473, and its D input connected to the $\overline{Q}$ output of flip-flop 462.

Logic network 48 incorporates a toggle type flip-flop 481, another D-type flip-flop 482, and an OR gate 483. The set (S) inputs of flip-flop 481 and 482 are grounded and the reset (R) inputs of these flip-flops are jointly connected to an output of OR gate 483. The C input of toggle flip-flop 481 is connected to the Q output of flip-flop 471 of network 47. Only the $\overline{Q}$ output of flip-flop 481 is used and it is connected back to the D input of the same flip-flop, and on to the C input of D-type flip-flop 482. The D input of flip-flop 482 is held high by the supply voltage $+V_{cc}$. Output 50 providing the valid fade break signal (see FIG. 1) is produced at the Q output of flip-flop 482. A first input of OR gate 483 is connected over a lead 484 to the Q output of RS flip-flop 462 in network 46, and the remaining input of OR gate 483 is connected over a lead 485 to receive the two level audio fade detection signal produced at output 38 of comparator 36 (see FIG. 1).

In general, networks 46, 47, and 48 cofunction to produce a two-level logic signal at output 50 of network 48 that goes high whenever these circuits detect the absence of video and audio during two consecutive fields of the television signal. Upon receipt of each delayed vertical synch pulse, RS flip-flop 462 is reset, if it is not already in the reset state, and will remain in the reset state throughout the ensuing video field so long as NOR gate 461 does not receive a high input from comparator 45, representing the absence of video. In other words, flip-flop 462 will remain reset so long as none of the raster lines contain a video amplitude that exceeds the above-described minimum valid video reference level (see FIG. 2), but will be switched to the set state if any line in the field does exceed the minimum valid video reference level. If flip-flip 462 is set, then the Q output switches high and causes flip-flops 481 and 482 of network 48 to be reset, which as described hereinafter, prevents the issuance of a valid fade break signal at output 50. On the other hand, if RS flip-flop 462 of network 46 remains reset throughout the entire field following the delayed vertical synch pulse, then the Q output stays low and the high logic level on the $\overline{Q}$ output is applied to the D input of flip-flop 471. Such an occurrence causes flip-flop 471 to assume a high level at the Q output upon receipt of the next undelayed vertical synch pulse applied to the C input of flip-flop 471, which represent the start of the next field. Thus, at the end of a first field that has no video present in any line, flip-flop 471 is switched so that the Q output is high, memorizing the fact that there was an absence of video in each of the lines of the preceding field.

Shortly after the D flip-flop 471 of network 47 is switched by the undelayed vertical synch at input C, the succeeding delayed vertical synch resets flip-flop 471 via lead 472 and the Q output swings low. Thus, the effect of flip-flop 471 is to produce a high-going pulse at output Q at the end of any single video field in which there is an absence of video in all of the lines. By using a delayed vertical synch pulse for reseting flip-flops 462 and 471 and as a gating signal applied to a second input of NOR gate 461, logic networks 46 and 47 mask the above-mentioned VIT signals that occur during an initial group of lines at the start of a video field. For example, according to a prevailing industry standard, the VIT signals are located between the fifth and nineteenth line of a field. These VIT signals, could, if applied to RS flip-flop 462, cause the flip-flop to be set, even thought the rest of the lines of the field are blank. Thus, the vertical synch pulse delayed by one-shot delay 49 (see FIG. 1) is selected to delay the vertical synch pulse sufficiently to span the VIT signals and thus delay the video detection function of flip-flop 462 until after the expiration of the VIT signals.

Toggle flip-flop 481 of logic network 48 responds to an initial high level at Q output of flip-flop 471 of network 47, representing a first field in which an absence of video has been detected for all the lines, and, is toggled so that the $\overline{Q}$ output switches from a normally high level to a low level on the leading edge of the high-going pulse applied to input C. Normally, toggle flip-flop 481 is in a reset state in which $\overline{Q}$ is high. After receiving the first high-going pulse from the Q output of flip-flop 471 of network 47, toggle flip-flop 481 of network 48 will respond to the next succeeding high-going pulse from the Q output of flip-flop 471, now representing the second consecutive field having an absence of video, and will toggle back to a state in which the $\overline{Q}$ output of flip-flop 481 is high.

D-type flip-flop 482 is clocked at the C input by the high-going edge of the signal at the $\overline{Q}$ output of toggle flip-flop 481, which as described occurs upon the detection of two consecutive fields having an absence of video. Responsively, the fixed high level signal applied to the D input of flip-flop 482 is copied to the Q output of the same flip-flop. The Q output of flip-flop 482 provides the output 50 that represents the valid fade break signal and thus a positive pulse is produced on output 50 as a result of the foregoing operation.

It has been assumed in the description immediately above that during the two consecutive fields in which an absence of video is detected, that there is a concurrent detection of an absence of audio by the audio detection circuitry. If, on the other hand, audio is detected during these two consecutive fields, output 38 from the audio detection channel, applies a high-going signal to one input of OR gate 483 and the output of gate 483 responsively resets both of flip-flops 481 and 482, clearing the response of these flip-flops to the detected absence of video. Similarly, if flip-flop 471 of memory logic 47, or flip-flop 481 and 482 of network 48 have been partially sequenced, such as by the detection of an absence of video in just one field, and the ensuing field has video, then RS flip-flop 462 will be set, causing the Q output to swing high and applying a positive level signal to input 484 of OR gate 483, again resetting and clearing flip-flops 481 and 482.

Figure 4:
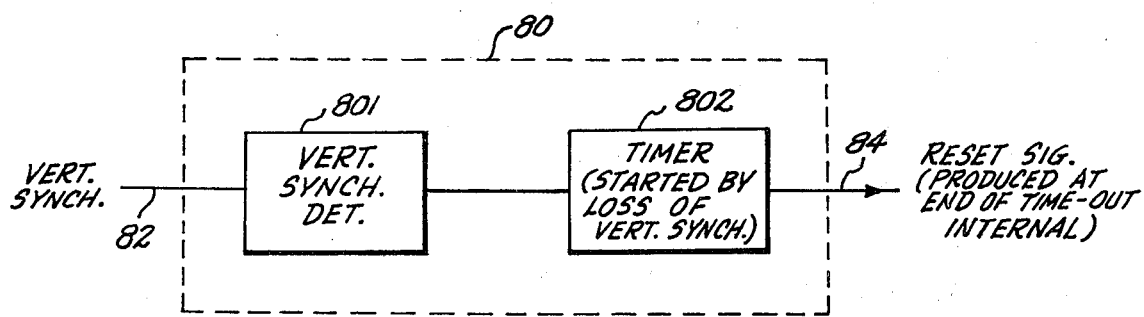
FIG. 4 is a detailed block diagram of still another portion of the circuit of FIG. 1.

With reference to FIG. 4, the time-out logic 80 for detecting the end of a broadcast, may be provided, as illustrated, by a serial connection of a vertical synch detector 801 and a timer 802. The input of synch detector 801 is connected at input 82 to the delayed vertical synch at junction 51, and continuously monitors the presence of vertical synch. So long as vertical synch is continuously applied to detector 801, the detector holds timer 802 in a nontiming or reset mode. However, whenever detector 802 fails to register a continuous succession of video synch pulses, timer 802 is enabled and responsively commences a timing interval, selected to provide a duration that will span any temporary loss of vertical synch such as might be caused by a momentary interruption of the television signal transmission.

After a suitable interval, such as 45 to 60 seconds, timer 802 times out and produces a reset signal at output 84. The reset signal is applied as shown in FIG. 1 to a reset input of pause control flip-flop 70, terminating the pause condition and allowing VTR 12 to continue running until shutdown by other means.

Operation

Figure 5:
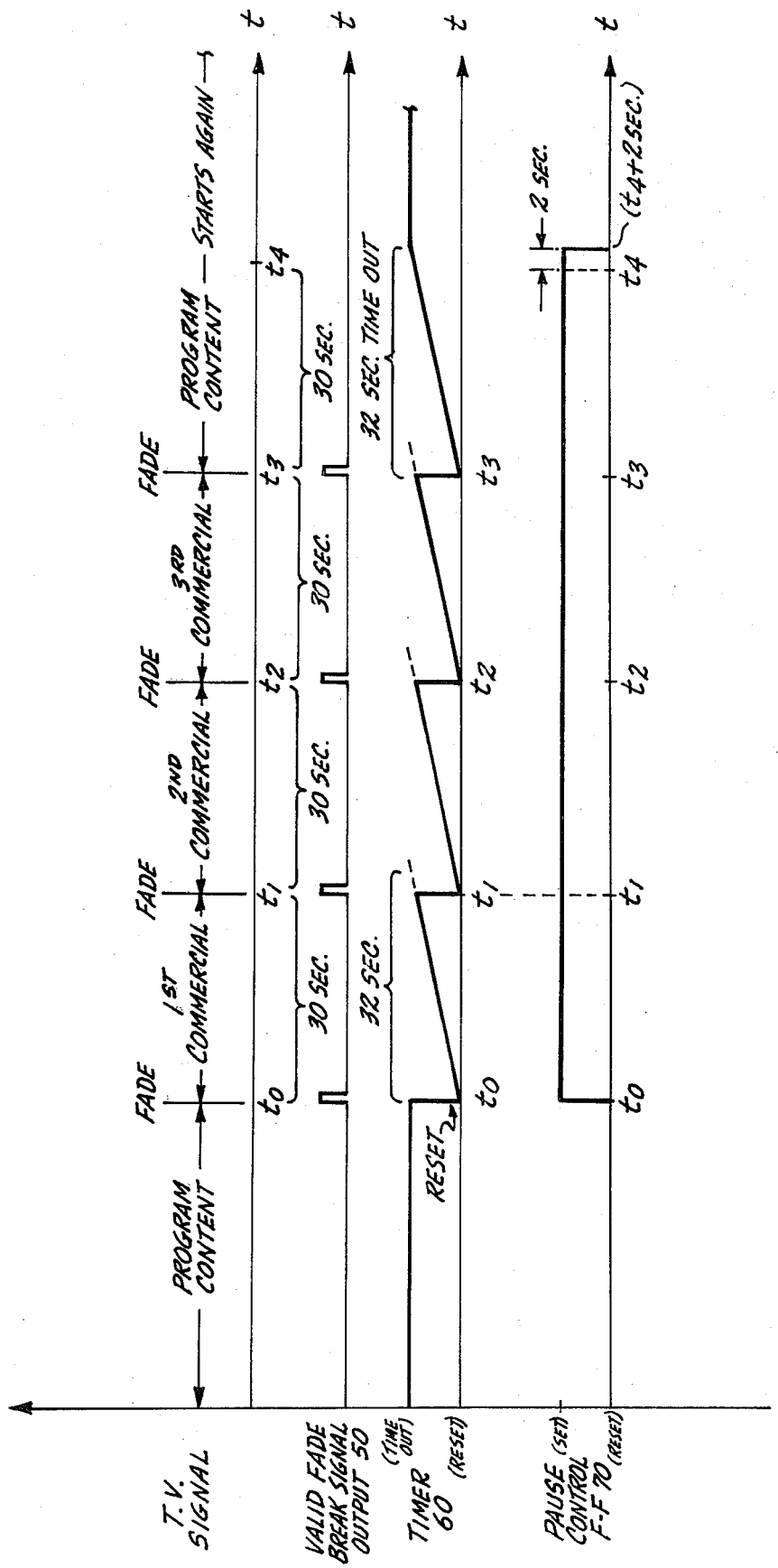
FIG. 5 is a diagram illustrating the timing relationship between certain salient signals of the control circuit shown in FIGS. 1-3 that occur during a commercial editing mode.

With control circuit 11 connected as shown in FIG. 1, the detection and timing circuitry of circuit 11 operates in response to a series of fade breaks in the manner illustrated by the timing diagram of FIG. 5. With reference thereto, the television signal, which may originate from a received air or cable transmission, or from any other available source, such as another videotape recorder, is shown to have program content that, for the purpose of example, is interrupted by a consecutive block of three commercial messages. The beginning and end of each of the first, second, and third commercial messages are marked by a break in the telecast, each break being evidenced by a fade condition of the video and audio components of the signal. Preferably, and in accordance with the embodiment of the invention disclosed herein, a valid or true break will be evidenced by the concurrence of both a video fade and an audio fade. Further assurance that the break is a valid one, is obtained by determining that the concurrent audio and video fade occurs over two successive fields. A false break in the form of a single field fade, is sometimes used for effect in the program content and should not be detected as a valid break.

Thus, in the diagram of FIG. 5, the occurrence at time $t_o$ of a valid fade produces a signal at output 50 (FIGS. 1 and 3) signalling a break between the program content and the start of a first commercial. Now, it has been determined that about 90 percent of all commercial messages are a maximum of 30 seconds long. Indeed, it has been determined that the majority of commercial messages are 30 seconds ($\pm 2$ seconds) long. A small percent of commercial messages are ten seconds in length. The predominant reason for the 30 second commercial message is that the viewer's attention and interest can be maintained for only that limited length of time. Thus, to exemplify the operation of the invention, the TV signal is shown in FIG. 5 as including a block of three 30-second commercials, although it will be appreciated that any number of commercial messages, including a single commercial message, will result in essentially the same operation, so long as none of the messages are greater than 30 seconds in length. The fade break, corresponding to an absence of audio and a momentary darkening of the screen of a receiver, are universally inserted at the start and end of each commercial message. Thus in the example of FIG. 5, the block of three commercial messages is accompanied by a series of fade breaks occurring at time $t_0$, $t_1$, $t_2$, and $t_3$. Output 50 produces a valid fade break pulse signal at each of these successive times, and it will be observed that the time duration between these successive pulses is limited to a maximum inter-pulse interval of 30 seconds.

Timer 60 as shown in FIG. 5 responds to the series of valid fade break pulse signals at output 50 by being switched from a quiescent time-out state to a reset state upon receipt of the first valid fade break pulse, which in FIG. 5 occurs at time $t_0$. At this moment timer 60 begins a counting. If not prematurely reset, timer 60 will continue counting until it times out. The time-out interval is selected to be at least equal to, and preferably slightly greater than the maximum expected duration of any of the commercial messages. Thus, using the predetermined 30-second maximum commercial length, timer 60 is set to provide a time-out period of from one to seven seconds longer than the expected maximum commercial length. Thirty-two seconds has been chosen in the present embodiment to provide the shortest effective time-out interval consistent with the need to provide an interval that exceeds the commercial message length of thirty seconds. By using a time-out interval of two seconds longer than the 30-second message length, timer 60 will be reset even though the successive fade break pulses at output 50 do not occur precisely at the 30-second interval due to slight mistiming by the operators and/or equipment at the point of origin of the television signal. A relatively few broadcast markets have a practice of using one minute commercial messages. For these markets timer 60 may be modified (or provided with a selectable alternative timing mode) to provide a basic time-out interval of 62 seconds, rather than 32 seconds.

Thus, with a 32-second time-out interval, timer 60 will commence timing on the trailing edge of the valid break pulse at output 50. Between time $t_0$ and $t_1$, timer 60 advances toward the 32-second time-out point, as represented by the ramp-shaped waveform. However, before reaching the 32-second time-out, another valid fade break pulse is produced at output 50, occurring at time $t_1$, which resets timer 60 and the timing sequence begins anew. This process is repeated at time $t_2$ in response to the fade break pulse between the second and third commercials, and at time $t_3$ at the end of the third commercial, corresponding to the resumption of the television program. The final timing interval of timer 60 now starts from time $t_3$, and in this case the full timing period is allowed to elapse. At 32 seconds from time $t_3$, a time-out signal is produced at output 66 of timer 60 (see FIG. 1).

The operation of pause control flip-flop 70 is illustrated in FIG. 5 as a waveform having two discrete levels corresponding to the reset and set states of flip-flop 70. At time $t_0$, the normal, or reset state of flip-flop 70 is changed to the set state in response to the same valid fade break pulse signal at output 50 that starts and resets timer 60. Thus at time $t_0$ flip-flop 70 switches to the set state. Flip-flop 70 remains in the set state until reset by the time-out signal produced at output 66 of timer 60 (see FIG. 1), and this does not occur until timer 60 is allowed to time out 32 seconds after the last valid fade break pulse signal which in this example occurs at time $t_3$. Upon being reset, flip-flop 70 causes pause control signal generator 72 to restart VTR 12 and the recording of the telecast is resumed. It is noted that the resumption of the recording occurs 32 seconds after the program content has started. Thus, an initial brief segment of the program is omitted when the recording is played back. However, lengthy empirical testing of the invention establishes that the loss of the brief section of programming after the end of the last commercial message is either unnoticeable or a minor and acceptable detraction from the overall effectiveness of the system.

Also, there is an infrequent situation in which the time interval between successive fade breaks is greater than 30 seconds such as caused either by an abnormally long commercial message, or as the result of two or more short commercial messages being jammed together without a sufficient video break. In such case, VTR 12 is restarted prematurely causing a brief segment of the commercial message to be recorded. Further, there may be infrequent occasions during the program content of a telecast in which a phantom fade may occur, such as during an extremely dark scene in the program, and if there is an absence of audio during that same scene, circuit 11 may be falsely triggered, causing a 32-second section of the program content to be deleted from the recording. Thus, the nature of the editing control circuit is such that it will perform reliably during 95 percent of the time. During the remaining 5 percent of the time, the circuit may mistrigger and cause segments of commercials to be recorded, or cause brief segments of the program content to be deleted from the middle of a show. On the whole, however, the operation of circuit 11 is adequately reliable, and the infrequent miscues have been found to be entirely acceptable.

Preferred Timing and Pause Control Circuits

Figure 6:
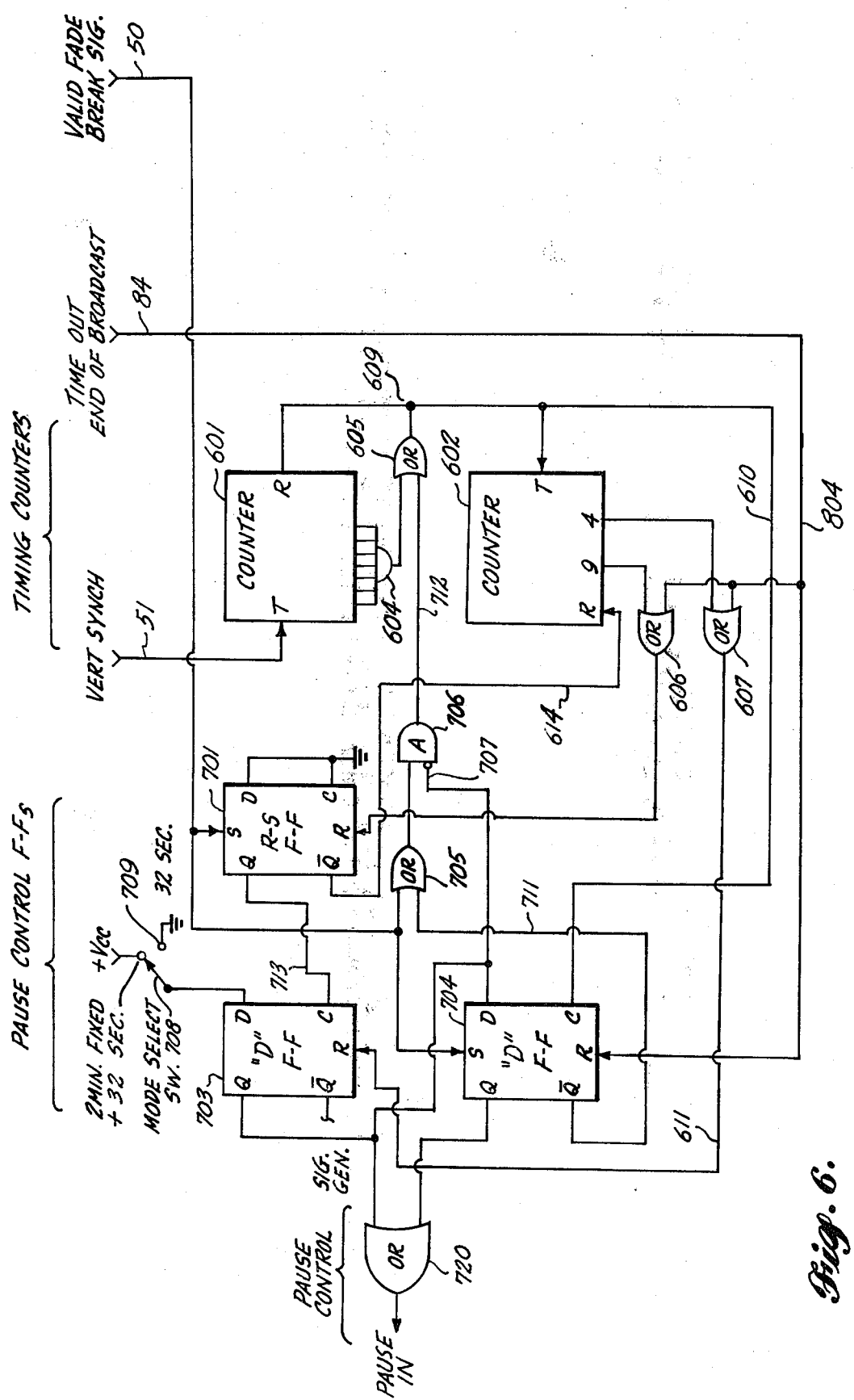
FIG. 6 is a detailed block and schematic diagram of a currently preferred and specific implementation of the timing and pause control circuitry components shown in FIG. 1.

FIG. 6 is a detailed block and schematic diagram of preferred timing and pause control circuitry for carrying out the functions of timer 60 and pause control flip-flop 70 of FIG. 1. More specifically, the circuitry of FIG. 6 provides two different, selectable, timing modes, one being the regular 32-second timing mode as described above in connection with FIG. 5, and the other mode being an extended, fixed timing interval followed by the 32-second retriggerable timing mode.

Thus, in FIG. 6, the function of timer 60 is provided by a first counter 601 clocked by vertical synch pulses, and a second counter 602, clocked by the 32-second time-out signal produced by counter 601. Associated with counters 601 and 602 are a multi-input AND gate 604 and three two-input OR gates 605, 606 and 607. Counter 601 is a twelve-bit binary counter; the plurality of outputs are decoded by the multi-input AND gate 604 to divide the standard vertical synch rate down to one pulse every 32 seconds which appears at the output of gate 604 so long as counter 601 is in a counting mode. However, as described more fully below, normally counter 601 is held in a noncounting, reset mode by a high level logic output from OR gate 605.

Counter 602 is a decade counter with decoded outputs at counts 4 and 9 connected respectively to one of the inputs of OR gate 606 and 607. The other inputs of OR gates 606 and 607 are connected to receive the time-out signal from time-out logic 80 (see FIG. 1). A clocking input (T) for counter 602 receives clocking pulses from the output of OR gate 605 for clocking counter 602 when counter 601 is activated to a counting mode.

The pause control flip-flops in the circuit of FIG. 6 include an RS flip-flop 701 and two "D" type flip-flops 703 and 704. Associated with flip-flops 701, 703, and 704 are a two-input OR gate 705 and an AND gate 706 having one input 707 inverted. The operating sequence of flip-flops 701, 703, and 704 is governed by a two-position mode selector switch 708 having a regular 32-second retriggerable timing mode (for causing the mode of operation as described above in connection with FIG. 5) selected when the wiper arm touches the grounded contact 709, and having a two-minute fixed, then a 32-second retriggerable mode, selected when the wiper arm touches the contact 710 (shown in this position in FIG. 6).

The pause control signal generator 72 of FIG. 1 is provided in the embodiment of FIG. 6 by a two-input OR gate 720, the output of which produces the pause control signal for application to pause input 22 (see FIG. 1).

The operation of the circuitry in FIG. 6 will be described first for the regular retriggerable 32-second mode for which switch 708 is positioned with the wiper arm touching grounded contact 709. It will be assumed now that all the flip-flops have been cleared and are in the reset state. Output 50 remains low awaiting the first valid fade break pulse. In this condition, the $\overline{Q}$ output of flip-flop 704 is high, applying a high logic signal over lead 711 to a second input of OR gate 705, causing the output of gate 705 to be high. Responsively, AND gate 706 produces a high output on lead 712 because the low logic level from the Q output of flip-flop 703 is inverted at input 707 of gate 706. The high level on lead 712 forces the output of OR gate 605 high holding the reset input (R) of counter 601 high, maintaining counter 601 in a noncounting, reset condition.

When the first valid fade break pulse appears on output 50, D-type flip-flop 704 will be switched to the set state, causing the $\overline{Q}$ output to swing low, removing the normally high logic level applied over lead 711 to the second input of OR gate 705. The output of OR gate 705 will remain high however, for the duration of the valid fade break pulse and then will swing low on the trailing edge of such pulse. Also when flip-flop 704 is set, the output of pause control gate 720 goes high, initiating the pause mode.

At the trailing edge of the fade break pulse on output 50, the output of OR gate 705 goes low, causing the output of AND gate 706 to also swing low, as will the output of OR gate 605 via lead 712, thereby removing the reset signal applied to the reset input (R) on gate 601. Counter 601 now commences counting, dividing the vertical synch rate down to a 32-second output pulse interval which is produced at the output of AND gate 604 and applied via OR gate 605 to junction 609. The appearance of this 32-second interval pulse at junction 609 causes counter 601 to be reset and clocks the C input of flip-flop 704 over lead 610 causing flip-flop 704 to be reset inasmuch as the D input of flip-flop 704 is at this time at a logic low. The Q output of flip-flop 704 thus swings low, terminating the high logic level signal applied to the associated input of OR gate 720 and thereby ending the pause interval. If, during the 32-second counting interval performed by counter 601, another valid fade break pulse appears on output 50 for the reasons described above in connection with FIG. 5, then a corresponding response occurs at gates 705, 706, and 602, resulting in the resetting of counter 601, and the 32-second counting interval is restarted. The restarting of counter 601 may occur any number of times in response to valid fade break pulses on output 50, that occur more frequently than the 32-second time-out interval. Thus far, the resulting operation of the circuitry in FIG. 6 corresponds to the above-description of timer 60 of FIG. 1 and the timing diagram in FIG. 5.

Now it will be assumed that mode selector switch 708 is moved to the two-minute fixed plus 32-second retrigger mode with the switch wiper arm touching contact 710 as shown in FIG. 6. In this mode, a high logic level (+Vcc) is continuously applied to the D input of flip-flop 703, which as mentioned above is normally in the reset state. Assume now that a fade break pulse appears on output 50, setting flip-flops 701 and 704. The setting of flip-flop 704 causes its Q output to swing high, as described above, immediately applying a high-level signal to the associated input of OR gate 720 and initiating the pause mode at the output of gate 720. The setting of RS flip-flop 701 causes its Q output to swing high, blocking flip-flop 703 by reason of connection 713 between the Q output of flip-flop 701 and the C input of flip-flop 703. Responsively flip-flop 703 switches to the set state, since the D input is continuously high by reason of the position of mode select switch 708. The Q output of flip-flop 703 thereby swings high holding the output of pause control OR gate 720 at a high level. Also as the Q output of flip-flop 703 swings high, the output of AND gate 706 is forced low at the inverted input 707 of that gate, causing lead 712 to remain at a logic low level, preventing subsequent fade break pulses from resetting counter 601 via OR gate 605. A counter 601 thus continues producing 32-second clock pulses at the output of gate 604, following the initial fade break pulse.

Every 32 seconds, another pulse appears at junction 609. Although these 32-second clock pulses are applied to the clock input of flip-flop 704 via lead 610, flip-flop 704 remains in the set state as long as the D input is held high by the Q output of flip-flop 703. The 32-second interval pulses generated at junction 609 are also applied to the clocking input (T) of counter 602, advancing the state of that counter toward a count of 10. Thus after the fourth 32-second clock pulse produced at junction 609 (corresponding to the elapse of 2 minutes plus 8 seconds from the first fade break pulse) the 4 count output of counter 602 goes high. Responsively, the output of OR gate 607 swings high and applies a reset signal over lead 611 to the reset input of flip-flop 703, restoring flip-flop 703 to the reset state. The pause control signal at the output of OR gate 720 remains high continuing the pause mode. Now, however, flip-flop 704 can be reset upon receipt of a 32-second time out pulse applied over lead 610 to the C input of flip-flop 704, inasmuch as the D input of that flip-flop is no longer held high by flip-flop 703. Thus at the end of the two-minute and eight-second fixed pause interval, the circuitry of FIG. 6 enters a retriggerable 32-second timing mode, which is the same as described herein above, and if no intervening fade break pulses appear on output 50 during this 32-second interval, counter 601 will time out. When that event occurs, a pulse is produced at junction 609, resetting counter 601, and resetting flip-flop 704, terminating the remaining high level input applied to OR gate 720 and ending the pause control mode.

To prevent the two-minute fixed timing mode from reoccurring during the ensuing 32-second retriggerable timing mode, counter 602 is not cleared until the clocking input (T) has received 9 clocking pulses. Upon receipt of the 9th clocking pulse, the 9 count output of counter 602 causes the output of OR gate 606 to swing high, resetting flip-flop 701 and hence clearing counter 602 by applying a reset signal over lead 614 connected between the $\overline{Q}$ of flip-flop 701 and the reset input (R) of counter 602.

A time out signal that occurs when the end of a broadcast is detected by time-out logic 80 (FIGS. 1 and 4) causes a reset signal to be applied over lead 804 to the reset input of flip-flop 704, and via lead 804 and OR gates 606 and 607 to the reset inputs of flip-flops 701 and 703. The time out signal on lead 804 holds these flip-flops in the reset or clear mode, preventing their response to a fade signal on output 50.

The alternative two-minute fixed plus 32-second retrigger mode provided by the circuitry of FIG. 6, is useful in recording telecasts in which the user anticipates from the prior practice of a particular station, that there is likely to be an extended length commercial, e.g., such as of 1-minute duration, inserted at the beginning of a block of commercials. Also, the extended fixed timing mode is useful for recording telecasts in which it can be anticipated that the broadcaster will jam a series of commercial messages together, without having the necessary fade break between consecutive commercial messages. It is observed that even in the extended fixed time mode, the retriggerable 32-second timing interval automatically becomes effective at the end of the initial two-minute interval so that the detection of valid fade breaks two minutes after the first detected break will hold VTR 12 in the pause mode until 32-seconds after the last detected break.

While only particular embodiments of the invention have been disclosed herein, it will be readily apparent to persons skilled in the art thatnumerous changes and modifications can be made thereto, including the use of equivalent means and devices and method steps, without departing from the spirit of the invention. For example, although it is preferable that a break in the telecast be detected by looking for both absence of video and a concurrent absence of audio, it may be desirable in some applications to rely on only the detected absence of video to produce a valid fade break signal. Furthermore, the timing circuitry shown in FIGS. 1 and 6 may be provided by any of a wide variety of available timing circuits, such as a retriggerable analog timer controlled by the charging rate of a capacitor. However, by using a counter clocked by a readily available and closely regulated frequency, such as vertical synch pulses, as done in the above-disclosed embodiment, the accuracy and stability of the timing interval is enhanced, and thus the disclosed form of timer 60 is preferred.

The embodiments of the invention in which an exclusive property or privilege is claimed are defined as follows:

1. A circuit for use with a commercial television signal for producing a control signal having a predetermined timing relationship to a series of breaks in a telecast indicative of one or more consecutive commercial interruptions in non-commercial program content in which each such break is characterized by a predetermined amplitude condition of the television signal, and in which the first of each such series of breaks occurs at the beginning of a first commercial interruption and succeeding breaks in such series occur at time intervals that do not normally exceed a predetermined time period, and the last of such series of breaks indicates the resumption of non-commercial program content, comprising:

detection circuit means for detecting said predetermined amplitude condition of the television signal associated with each of said breaks in a telecast, wherein said detection circuit means comprises video level detection means for detecting a predetermined minimum video level of a video component of said television signal and audio detection means for detecting a predetermined minimum audio level of an audio component of said television signal and means for determining the coincidence of said video component being below said predetermined minimum video level and said audio component being below said predetermined minimum audio level for a predetermined minimum time greater than one video field duration;

electrical timing means for providing a predetermined retriggerable timing interval, said detection circuit means coupled to said timing means for triggering a start of said timing interval when a first of said series of breaks occurs and for retriggering said start of said timing interval each time said detection circuit means detects one of said succeeding breaks, said timing interval being selected to be equal to or greater than said predetermined time period; and, control signal generating means having a quiescent state representing the occurrence of non-commercial program content and having a second state in which a control signal is produced that indicates the occurrence of said one or more consecutive commercial interruptions, said control signal generating means being responsive to said detection circuit means detecting a first of said series of breaks to change from said quiescent state to said second state, and being responsive to said timing means for resuming said quiescent state when said timing means times out at an end of a timing interval that was started by said detection circuit means detecting the last of said series of breaks.

2. The circuit set forth in claim 1 wherein said detection circuit means comprises means for detecting said coincidence for a duration of at least two consecutive fields of said television signal, said duration of at least two consecutive fields corresponding to said predetermined minimum time.

3. The circuit set forth in claim 1, wherein said electrical timing means comprises means for providing that said predetermined timing interval is from one to seven seconds longer than said predetermined time period.

4. The circuit of claim 1, wherein said video level detection means for detecting said level of said video component of said television signal includes means for detecting said level during a plurality of consecutive horizontal signal lines of said video component occurring over said predetermined minimum time.

5. The circuit set forth in claim 1, wherein said electrical timing means comprises a resettable counter means, and means for applying clocking pulses to said counter means.

6. The circuit set forth in claim 5, wherein said means for applying said clocking pulses to said counter means comprises means for separating vertical synchronizing pulses from said television signal and applying said vertical synchronizing pulses as clocking pulses to said counter means.

7. The circuit set forth in claim 1, further comprising:
mode selection switching means having first and second selectable modes;
a first mode logic circuit means connected between said mode selection switching means and said electrical timing means for disposing said electrical timing means in a condition that provides said predetermined retriggerable timing interval; and
second mode circuit means connected to said electrical timing means and including means for providing an extended, fixed timing interval that is longer than said predetermined retriggerable timing interval, and further including means for providing a second predetermined retriggerable timing interval, said second timing mode circuit means coupled to said detection circuit means for initiating a start of said extended, fixed timing interval in response to the detection of a first of said breaks in said telecast, and said means providing said second predetermined retriggerable timing interval being so associated with said means providing said extended, fixed timing interval for automatically causing said means providing said second predetermined retriggerable timing interval to be retriggered by the detection of any breaks in said telecast that occur after the end of said extended, fixed timing interval; and circuit means for causing said control signal generating means to assume and remain in said second state so long as said second mode timing means is timing in either said extended, fixed timing interval or said second predetermined retriggerable timing interval.

8. The circuit set forth in claim 7, wherein said means of said second mode circuit means that provides said second retriggerable timing interval has a time-out interval that is substantially equal to said predetermined retriggerable timing interval of said electrical timing means.

9. A circuit for use with a commercial television signal for producing a control signal having a predetermined timing relationship to a series of telecast breaks indicative of one or more commercial interruptions in non-commercial program content in which each such break is characterized by a predetermined amplitude condition of the television signal existing for a predetermined minimum time greater than one video field duration, comprising:

detection circuit means for detecting said predetermined amplitude condition for said predetermined minimum time associated with each of said breaks in a telecast, wherein said detection circuit means comprises video level detection means for detecting a level of a video component of said television signal that corresponds to a video picture fade when occurring over said predetermined minimum time, and an audio level detection means for detecting a predetermined minimum audio level for an audio component of said television signal corresponding to an audio fade when occurring over said predetermined minimum time;

electrical timing means having a triggerable timing mode providing a predetermined time-out duration, said timing means being initially triggered and thereafter retriggered by said detection circuit means in response to the detection of successive breaks in a telecast; and control circuit means for producing said control signal in response to and for so long as said electrical timing means is in said timing mode.

10. The circuit of claim 9 wherein each of said breaks is characterized by said predetermined minimum time being substantially that of the duration of two consecutive video fields, and wherein said detection circuit means comprises means for detecting the presence of said predetermined amplitude condition for a duration of substantially two consecutive video fields.

11. In combination, a video tape recorder for recording a television signal and having a pause control for temporarily interrupting said recording in response to the receipt of a pause control signal, and a commercial message editing circuit for producing said pause control signal, wherein the improvement in said commercial message editing circuit comprises:

detection circuit means for detecting each of a series of breaks in a telecast that are indicative of one or more commercial interruptions in non-commercial program content and in which each of such breaks is associated with a predetermined amplitude condition of the video and audio components of the television signal that exists for a predetermined minimum time greater than one video field duration, said detection circuit means comprising means for detecting said predetermined amplitude condition of said video component of the television signal existing for said predetermined minimum time, and means for detecting a predetermined audio level of said audio component of the television signal existing for said predetermined minimum time;

electrical timing means having a retriggerable timing mode providing a predetermined time-out interval, said timing means being initially triggered and thereafter retriggered by said detection circuit means in response to the detection of successive breaks in a telecast; and means responsive to said electrical timing means for producing said pause control signal in response to and for so long as said electrical timing means is in said retriggerable timing mode, and for terminating said pause control signal when said electrical timing means times out at the end of said predetermined time-out interval.

12. The improvement in said commercial message editing circuit in the combination of claim 11, wherein said predetermined minimum time over which said predetermined amplitude condition of the television signal exists during each of said breaks is substantially that of the duration of two consecutive video fields, and wherein said detection circuit means comprises means for detecting said predetermined amplitude condition of said television signal for a duration of substantially two consecutive video fields.

13. A method of editing commercial messages from a video tape recording of a telecast in which such messages interrupt the non-commercial program content of such telecast, the steps comprising:

recording the telecast on a video tape recorder;

electrically detecting each of a series of breaks that occur in said telecast and that are characterized by a predetermined amplitude condition of the video and audio components of the television signal existing for a predetermined minimum time greater than one video field duration, and in which a first of such series of breaks marks the beginning of a first commercial message and succeeding breaks in such series occur at time intervals that do not normally exceed a predetermined time period, and in which a last of such series of breaks indicates the resumption of non-commercial program content of said telecast;

automatically initiating a timing interval of predetermined duration in response to the detection of a first of said series of breaks, and automatically restarting said timing interval each time a succeeding break in said series is detected, selecting said timimg interval of predetermined duration to be equal to or just greater than said predetermined time period;

generating said editing control signal in response to the step of detecting a first of said series of breaks, and continuing to generate said control signal until said timing interval times out without being restarted; and applying said editing control signal to the video tape recorder for temporarily interrupting the recording step for the duration of said control signal.

14. The method set forth in claim 13, wherein said timing interval of predetermined duration is selected to be from one to seven seconds longer than said predetermined time period.

15. The method set forth in claim 13 wherein said predetermined minimum time is substantially the duration of two consecutive video fields.

* * * * *